United States Patent
Chandra et al.

(10) Patent No.: US 10,084,868 B2
(45) Date of Patent: Sep. 25, 2018

(54) IOT GATEWAY FOR WEAKLY CONNECTED SETTINGS

(71) Applicant: Microsoft Technology Licensing, LLC, Redmond, WA (US)

(72) Inventors: Ranveer Chandra, Kirkland, WA (US); Ashish Kapoor, Kirkland, WA (US); Sudipta Sinha, Redmond, WA (US); Amar Phanishayee, Seattle, WA (US); Deepak Vasisht, Cambridge, MA (US); Xinxin Jin, San Diego, CA (US); Madhusudhan Gumbalapura Sudarshan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 195 days.

(21) Appl. No.: 15/256,563

(22) Filed: Sep. 3, 2016

(65) Prior Publication Data

US 2018/0069933 A1 Mar. 8, 2018

(51) Int. Cl.
*H04N 5/232* (2006.01)
*H04L 29/08* (2006.01)
(Continued)

(52) U.S. Cl.
CPC .............. *H04L 67/18* (2013.01); *G01C 11/02* (2013.01); *H04L 12/66* (2013.01);
(Continued)

(58) Field of Classification Search
CPC ... H04L 67/18; H04L 67/2828; H04L 67/322; H04L 67/12; H04L 67/10; H04L 47/762;
(Continued)

(56) References Cited

U.S. PATENT DOCUMENTS

| 8,731,836 B2 | 5/2014 | Lindores et al. |
| 9,058,633 B2 | 6/2015 | Lindores et al. |

(Continued)

FOREIGN PATENT DOCUMENTS

| EP | 2882140 A1 | 6/2015 |
| WO | 2012092794 A1 | 7/2012 |

OTHER PUBLICATIONS

Satyanarayanan, et al., "Edge Analytics in the Internet of Things", in Journal of IEEE Pervasive Computing, vol. 14, No. 2, Apr. 2015, pp. 24-31.

(Continued)

*Primary Examiner* — Le H Luu
(74) *Attorney, Agent, or Firm* — Fountainhead Law Group P.C.

(57) ABSTRACT

A gateway that may be implemented in a local network and that communicates with a cloud network to provide efficient services in a weakly connected setting is disclosed. The gateway may be configured to enable services that efficiently utilize resources in both of the gateway and the cloud network, and provide a desired quality of service while operating in a weakly connected setting. The gateway may provide data collection and processing, local network services, and enable cloud services that utilize data collected and processed by the gateway. The local network may include one or more sensors and/or video cameras that provide data to the gateway. In a further implementation, the gateway may determine an allocation of one or more tasks of a service between the gateway and a cloud network by determining the allocation of the one or more service tasks based on desired service latency.

21 Claims, 6 Drawing Sheets

(51) Int. Cl.
| | |
|---|---|
| H04L 12/66 | (2006.01) |
| H04L 12/24 | (2006.01) |
| H04L 12/923 | (2013.01) |
| H04N 7/18 | (2006.01) |
| G01C 11/02 | (2006.01) |

(52) U.S. Cl.
CPC ........ *H04L 41/0896* (2013.01); *H04L 47/762* (2013.01); *H04L 67/10* (2013.01); *H04L 67/12* (2013.01); *H04L 67/2828* (2013.01); *H04L 67/322* (2013.01); *H04N 5/23238* (2013.01); *H04N 7/181* (2013.01)

(58) Field of Classification Search
CPC ... H04L 41/0896; H04L 12/66; H04L 67/025; H04N 5/23238; H04N 7/181; G01C 11/02; G01B 11/28; G06F 11/1076; G06F 8/70; G06Q 10/06; G06T 17/05; G08B 17/11; G11B 27/034; H04W 4/046; H04W 4/21
See application file for complete search history.

(56) References Cited

U.S. PATENT DOCUMENTS

| | | | | |
|---|---|---|---|---|
| 2008/0221843 | A1* | 9/2008 | Shenkar ................. | G06T 17/05 703/1 |
| 2009/0015674 | A1 | 1/2009 | Alley et al. | |
| 2009/0103433 | A1 | 4/2009 | Katis et al. | |
| 2010/0135643 | A1* | 6/2010 | Fleming ............... | G11B 27/034 386/224 |
| 2012/0114229 | A1 | 5/2012 | Zhou | |
| 2013/0110565 | A1* | 5/2013 | Means, Jr. ............. | G06Q 10/06 705/7.11 |
| 2014/0136286 | A1 | 5/2014 | Hovis et al. | |
| 2014/0136952 | A1 | 5/2014 | Zhu et al. | |
| 2014/0380264 | A1 | 12/2014 | Misra et al. | |
| 2015/0022666 | A1* | 1/2015 | Kay ....................... | H04L 67/025 348/159 |
| 2015/0187109 | A1 | 7/2015 | Mentzer | |
| 2015/0264554 | A1* | 9/2015 | Addepalli ............. | H04W 4/046 370/328 |
| 2015/0377615 | A1* | 12/2015 | Lake ...................... | G01B 11/28 348/141 |
| 2015/0379702 | A1 | 12/2015 | Ulman | |
| 2016/0028823 | A1* | 1/2016 | Peters .................. | G06F 11/1076 709/203 |
| 2016/0047662 | A1* | 2/2016 | Ricci ..................... | H04W 4/21 701/540 |
| 2016/0050840 | A1 | 2/2016 | Sauder et al. | |
| 2016/0133108 | A1* | 5/2016 | Bucsa .................... | G08B 17/11 340/629 |
| 2016/0165650 | A1 | 6/2016 | Kim et al. | |
| 2017/0060574 | A1* | 3/2017 | Malladi .................... | G06F 8/70 |

OTHER PUBLICATIONS

Lenz, Gadi, "The Data of Things: How Edge Analytics and IoT Go Hand in Hand", Published on: Sep. 22, 2015 Available at: http://www.datanami.com/2015/09/22/the-data-of-things-how-edge-analytics-and-iot-go-hand-in-hand/.

Raphael, Chris, "IoT Architectures for Edge Analytics", Published on: Nov. 21, 2015 Available at: http://www.rtinsights.com/iot-architectures-for-edge-analytics/.

Collett, Stacy, "Cloud vs Edge in an IoT world", Published on: Apr. 27, 2016 Available at: https://iotworldnews.com/2016/04/cloud-vs-edge-in-an-iot-world/.

"Explaining the Internet of Things Ecosystem and Taxonomy", Retrieved on: Jun. 13, 2016 Available at: https://451research.com/images/Marketing/IoT/IoT_Taxonomy_12.1.15.pdf.

"The Internet of Things Reference Model", in White Paper of Cisco, Jun. 4, 2014, pp. 1-12.

Madabushi, Vasu, "Compute at the IoT edge: A real necessity today", Published on: May 11, 2016 Available at: https://iotworldnews.com/2016/05/compute-at-the-iot-edge-a-real-necessity-today/.

Loke, Seng Wai, "The Internet of Flying-Things: Opportunities and Challenges with Airborne Fog Computing and Mobile Cloud in the Clouds", in Proceedings of Computing Research Repository, Jul. 2015, pp. 1-5.

McKinney, David, "New Intel Internet of Things Platform Connects the Unconnected", Published on: Dec. 15, 2014 Available at: https://blogs.intel.com/iot/2014/12/15/new-intel-iot-platform-connects-unconnected-internet-things/.

"IEEE Standard", Retrieved on: Jun. 20, 2016 Available at: https://standards.ieee.org/findstds/standard/802.11af-2013.html.

Lee, et al., "Sensing technologies for precision specialty crop production", in Journal of Computers and Electronics in Agriculture, vol. 74, Issue 1, Oct. 2010, pp. 2-33.

"Adaptrum", Retrieved on: Jun. 20, 2016 Available at: http://www.adaptrum.com/.

Andrade-Sanchez, et al., "Performance assessment of wireless sensor networks in agricultural settings", in Proceedings of ASABE Annual International Meeting, Technical Papers, Jun. 2007.

Baggio, Aline, "Wireless sensor networks in precision agriculture", in Proceedings of ACM Workshop on Real-World Wireless Sensor Networks, Jun. 2005, 2 pages.

Bahl, et al., "White space networking with wi-fi like connectivity", in Journal ACM SIGCOMM Computer Communication Review, vol. 39, Issue 4, Aug. 17, 2009, pp. 27-38.

Botterill, et al., "Real-time aerial image mosaicing", in Proceedings of 25th International Conference of Image and Vision Computing New Zealand, Nov. 2010, 8 pages.

Brown, et al., "Automatic Panoramic Image Stitching using Invariant Features", in Proceedings of International Journal of Computer Vision, vol. 74, Issue 1, Aug. 2007, pp. 59-73.

Cai et al. "The stitching of aerial videos from UAVs", in Proceedings of 28th International Conference on Image and Vision Computing New Zealand, Nov. 27, 2013, pp. 448-452.

G. Cassman, Kenneth, "Ecological intensification of cereal production systems: Yield potential, soil quality, and precision agriculture", in Proceedings of the National Academy of Sciences, vol. 96, Issue 11, May 1999, pp. 5952-5959.

"Connected Farm", Retrieved on: Jun. 21, 2016 Available at: https://www.connectedfarm.com/.

"DataMapper Inflight", Retrieved on: Jun. 21, 2016 Available at: http://www.precisionhawk.com/datamapperinflight.

"John Deere Field Connect", Retrieved on: Jun. 21, 2016 Available at: https://www.deere.com/en_US/products/equipment/ag_management_solutions/field_and_crop_solutions/john_deere_field_connect/john_deere_field_connect.page.

"John Deere Sensors", Retrieved on: Jun. 21, 2016 Available at: https://www.deere.com/en_US/products/equipment/sensors/sensors.page.

"DJI Developer", Retrieved on: Jun. 21, 2016 Available at: https://developer.dji.com/.

"DroneDeploy", Retrieved on: Jun. 21, 2016 Available at: https://dronedeploy.com/.

"Precision Maps", Retrieved on: Jun. 17, 2016 Available at: http://www.farms.com/precision-agriculture/precision-maps/.

Franco, et al., "Energy-aware coverage path planning of UAVS", in Proceedings of IEEE International Conference in Autonomous Robot Systems and Competitions, Apr. 8, 2015, pp. 111-117.

"FreeWave", Retrieved on: Jun. 16, 2016 Available at: http://www.freewave.com/.

Godfray, et al., "Food security: The challenge of feeding 9 billion people", in Journal of Science, vol. 327, Issue 5967, Feb. 12, 2010, pp. 812-818.

Hartley, et al., "Multiple View Geometry in Computer Vision", in Publication of Cambridge University Press, Mar. 2004.

"Agricultural Technologies Could Increase Global Crop Yields as Much as 67 Percent and Cut Food Prices Nearly in Half by 2050",

(56) References Cited

OTHER PUBLICATIONS

Published on: Feb. 12, 2014 Available at: https://www.ifpri.org/news-release/agricultural-technologies-could-increase-global-crop-yields-much-67-percent-and-cut.
Langendoen, et al., "Murphy loves potatoes: experience from a pilot sensor network deployment in precision agriculture", in Proceedings of 20th IEEE International Parallel & Distributed Processing Symposium, Apr. 25, 2006, 8 pages.
Schmidt, James, "Weak Internet connectivity in rural areas hindering agricultural production", Published on: Apr. 4, 2016 Available at: https://www.ksre.k-state.edu/news/news-stories/2016-news-releases/april/internet-connectivity040416.html.
Kim, et al., "Soil micronutrient sensing for precision agriculture", in Journal of Environmental Monitoring, Issue 11, Aug. 13, 2008, pp. 1810-1824.
"Kolor", Retrieved on: Jun. 17, 2016 Available at: http://www.kolor.com/.
Kumar, et al., "Aerial video surveillance and exploitation", in Proceedings of the IEEE, vol. 89, Issue 10, Oct. 2001, pp. 1518-1539.
Kwatra, et al., "Graphcut textures: image and video synthesis using graph cuts", in Journal ACM Transactions on Graphics, vol. 22, Issue 3, Jul. 2003, pp. 277-286.
Lee, et al., "A modular 1mm3 die-stacked sensing platform with optical communication and multi-modal energy harvesting", in Proceedings of IEEE International Solid-State Circuits Conference, Feb. 22, 2012, pp. 402-404.
Levis, Philip, "Experiences from a decade of tinyos development", in Proceedings of 10th USENIX Symposium on Operating Systems Design and Implementation, Oct. 8, 2012, pp. 207-220.
Li, et al., "Large scale image mosaic construction for agricultural applications", in Journal of IEEE Robotics and Automation Letters, vol. 1, Issue 1, Jan. 2016, pp. 295-302.
"LoRa Technology", Retrieved on: Jun. 21, 2016 Available at: https://www.lora-alliance.org/What-Is-LoRa/Technology.
Mainwaring, et al., "Wireless Sensor Networks for Habitat Monitoring", in Proceedings of the 1st ACM international workshop on Wireless sensor networks and applications, Sep. 28, 2002, pp. 88-97.
McBratney, et al., "Estimating Average and Proportional Variograms of Soil Properties and Their Potential Use in Precision Agriculture", in Journal of Precision Agriculture, vol. 1, Issue 2, Sep. 1999.
McBratney, et al., "Future Directions of Precision Agriculture", in Journal of Precision Agriculture, vol. 6, Issue 1, Feb. 2005, pp. 7-23.
"Microsoft Research-Image composite editor", Retrieved on: Jun. 21, 2016 Available at: http://research.microsoft.com/en-us/um/redmond/projects/ice/.
Mueller, et al., "Closing Yield Gaps through Nutrient and Water Management", in Journal of Nature, vol. 490, Oct. 11, 2012, pp. 254-257.
Ortiz, et al., "Management Zones II—Basic Steps for Delineation", Published on: Mar. 2011 Available at: https://sites.aces.edu/group/crops/precisionag/Publications/Timely%20Information/Management%20Zones%20II%20-%20Basic%20Steps%20for%20Delineation.pdf.
"PIX4D", Retrieved on: Jun. 21, 2016 Available at: https://pix4d.com/.
Pols, Mary, "To run their businesses, farmers need reliable internet connections", Published on: Feb. 8, 2015 Available at: http://www.pressherald.com/2015/02/08/to-run-their-businesses-farmers-need-reliable-internet-connections/.
"Precision Planting-Ag Insights", Retrieved on: Jun. 21, 2016 Available at: http://www.precisionplanting.com/#ag_insights/.
"International Search Report and Written Opinion Issued in PCT Application No. PCT/US2017/048100", dated Feb. 9, 2018, 22 Pages.
Rasmussen, et al., "Gaussian Processes for Machine Learning", in Publication of the MIT Press, Nov. 2005, 266 pages.
Roberts, et al., "Connecting africa using the tv white spaces: From research to real world deployments", in Proceedings of the 21st IEEE International Workshop on Local and Metropolitan Area Networks, Apr. 22, 2015, 6 pages.
Ruiz-Garcia, et al., "A review of wireless sensor technologies and applications in agriculture and food industry: State of the art and current trends", in Journal of Sensors, vol. 9, Issue 6, Jun. 16, 2009, pp. 4728-4750.
Rosegrant, et al., "Food Security in a World of Natural Resource Scarcity: The role of agricultural technologies", in Publication of International Food Policy Research Institute, Feb. 12, 2014, 251 pages.
Sabri, et al., "Wireless Sensor Network Wave Propagation in Vegetation", in Publication of Springer, Dec. 28, 2014.
Schepers, et al., "Appropriateness of management zones for characterizing spatial variability of soil properties and irrigated corn yields across years", in Agronomy Journal, vol. 96, No. 1, Jan. 2004, pp. 195-203.
Schimmelpfennig, David, "Cost Savings from Precision Agriculture Technologies on U.S. Corn Farms", Published on: May 2, 2016 Available at: http://www.ers.usda.gov/amber-waves/2016-may/cost-savings-from-precision-agriculture-technologies-on-us-corn-farms.aspx#.V2kKXfl94dV.
"Campbell Scientific", Retrieved on: Jun. 21, 2016, Available at: https://www.campbellsci.com/products.
Selavo, et al., "Luster: wireless sensor network for environmental research", in Proceedings of the 5th international conference on Embedded networked sensor systems, Nov. 6, 2007, pp. 103-116.
"SenseFly", Retrieved on: Jun. 21, 2016, Available at: https://www.sensefly.com/home.html.
Shamos, Michael Ian, "Computational Geometry", in Dissertation of Yale University, May 1978, 244 pages.
"Sigfox", Retrieved on: Jun. 21, 2016, Available at: http://www.sigfox.com/.
Sinha, et al., "Pan—tilt—zoom camera calibration and high-resolution mosaic generation", in Journal of Computer Vision and Image Understanding, vol. 103, Issue 3, Sep. 2006, pp. 1-20.
Soderstrom, et al., "Adaptation of regional digital soil mapping for precision agriculture", in International Journal on Advances in Precision Agriculture, Feb. 27, 2016, 20 pages.
Stafford, J.V., "Precision Agriculture", in Publication of Wageningen Academic Publishers, Jun. 30, 2005.
Szeliski, Richard, "Image alignment and stitching: A tutorial", in Technical report of MSR-TR-2004-92, Oct. 2004, 89 pages.
Szeliski, et al., "Fast Poisson Blending using Multi-Splines", in Proceedings of IEEE International Conference on Computational Photography, Apr. 2011, 8 pages.
Wark, et al., "Transforming agriculture through pervasive wireless sensor networks", in Journal of IEEE Pervasive Computing, vol. 6, Issue 2, Apr. 2007, pp. 50-57.
"The Weather Channel", Retrieved on: Jun. 21, 2016, Available at: https://weather.com/.
"Food production must double by 2050 to meet demand from worlds growing population, innovative strategies needed to combat hunger, experts tell second committee", in Proceedings of Sixty-fourth General Assembly, Oct. 9, 2009, 4 pages.
Werner-Allen, et al., "Fidelity and yield in a volcano monitoring sensor network", in Proceedings of the 7th symposium on Operating systems design and implementation, Nov. 6, 2006, pp. 381-396.
Xu, et al., "Performance evaluation of color correction approaches for automatic multi-view image and video stitching", in Proceedings of IEEE Conference on Computer Vision and Pattern Recognition, Jun. 13, 2010, pp. 263-270.
Zhang, et al., "The application of small unmanned aerial systems for precision agriculture: a review", in International Journal on Advances in Precision Agriculture, vol. 13, Issue 6, Dec. 2012.
"Drones for Agriculture", Retrieved on: Aug. 5, 2016 Available at: https://www.sensefly.com/applications/agriculture.html.
"Agriculture: Risk Management Use Case", Published on: Jan. 21, 2016 Available at: http://www.giscloud.com/blog/agriculture-risk-management-use-case/.
"Albris the intelligent mapping & inspection drone", Retrieved on: Aug. 5, 2016 Available at: https://www.sensefly.com/drones/albris.html.

(56) References Cited

OTHER PUBLICATIONS

Pullano, Gary, "Drones seen as a method to manage fruit production", Published on: Apr. 2, 2015 Available at: http://fruitgrowersnews.com/article/drones-seen-as-a-method-to-manage-fruit-production/.

Colomina, et al., "Unmanned aerial systems for photogrammetry and remote sensing: A review", in ISPRS Journal of Photogrammetry and Remote Sensing, vol. 92, Jun. 2014, pp. 79-97.

"UAV—/ Drone-based Precision Agriculture & Smart Farming", Published on: May 6, 2015 Available at: http://www.asctec.de/en/uav-drone-based-precision-agriculture-smart-farming/.

Coopersmith, et al., "Using similarity of soil texture and hydroclimate to enhance soil moisture estimation", in Journal of Hydrology Earth System Sciences, vol. 18, Aug. 20, 2014, pp. 3095-3107.

Mcbratney et. al., Estimating Average and Proportional Variograms of Soil Properties and Their Potential Use in Precision Agriculture, Precision Agriculture pp. 125-152,. published by Kluwer Academic Publishers, 1999.

Hartley et. al., Multiple View Geometry in computer Vision, pp. 1-655, published by Cambridge University Press, 2000.

Stafford, Precision Agriculture '05, pp. 1-1005, Wageningen Academic Publishers, published 2005.

Zhang et. al., The Application of Small Unmanned Aerial Systems for Precision Agriculture, Precision Agriculture, pp. 693-712, published Jul. 2012.

Sabri et. al., Wireless Sensor Network Wave Propagation in Vegetation, ResearchGate at https://www.researchgate.net/publication/305760347, pp. 283-298, published Aug. 2016.

\* cited by examiner

IOT GATEWAY FOR WEAKLY CONNECTED SETTINGS

BACKGROUND

The Internet of Things (IoT) service and device market is rapidly expanding. The number of IoT connected devices is expected to number in the tens, or even hundreds, of billions within the next several decades. The range and number of Internet or "cloud" based services that utilize IoT connected devices is also expected to expand rapidly.

A key challenge in providing services to IoT connected devices is the need to provide services in areas that lack good Internet connectivity. For example, Internet connectivity is often weak and unreliable in geographically remote areas where cloud based services could prove useful. Weak and unreliable internet connectivity is also common in developing countries where cloud based services could also prove useful.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

The embodiments of the disclosure provide implementations of Internet of Things (IoT) (i.e., "cloud") connected gateways for use in weakly connected settings. The weakly connected settings may is settings in which connectivity for the gateway to the internet is only available intermittently, and/or is only available with poor quality or low speed/low bandwidth connections.

In an embodiment, a gateway may be implemented in a local network that communicates with a cloud network through the gateway in a weakly connected setting. The gateway may be configured to enable services that efficiently utilize resources in both of the gateway and the cloud network, and provide a desired quality of service while operating in a weakly connected setting. The gateway may provide data collection and processing, local network services, and enable cloud services that utilize data collected and processed by the gateway. The local network may include one or more sensors and/or video cameras that provide data to the gateway.

In an implementation, the gateway receives first data from one or more sensors in the local network, processes a first portion of the first data to generate second data and provides web services in the local network using a second portion of the first data and the generated second data. The gateway may queue the second portion of the first data as having a time sensitive priority for sending to the cloud network. The gateway may also queue the generated second data as having a non-time sensitive priority for sending to the cloud network. The first portion of the first data may include video data received from one or more video cameras. The second data may be generated by processing the video data to create an orthomosaic. The second portion of the first data may include sensor data received from one or more environmental sensors. The orthomosaic and the sensor data may be combined at the gateway to generate a precision map used in local network services. The orthomosaic and sensor data may be also be utilized for providing cloud services, and updating those cloud services as each of the orthomosaic and sensor data is received in the cloud network.

Web services in the local network, such as viewing of a video based on the video data or the provision of a service based on the precision map, may be provided using the results of the data processing performed in the gateway rather than relying on the cloud network. Cloud network services that require more processing resources and that are less time critical, such as services that use the sensor data and/or orthomosaic, may be supported by the gateway. The gateway may send the sensor data and/or orthomosaic to the cloud network when bandwidth between the gateway and cloud network is available. The time sensitivity of the queued data may be configured so that data that is time critical of changes more often, such as the sensor data, will be sent more often to the cloud network than data that changes less often, such as the orthomosaic.

In a further implementation a gateway in a weakly connected setting within a local network may determine an allocation of one or more tasks of a service between the gateway and a cloud network. A desired latency for the service may be determined. The gateway may allocate a first task of the one or more tasks to the gateway and a second task of the one or more tasks to the cloud network to provide the desired latency. In another implementation, available bandwidth between the gateway and cloud network, and processing times for a first task and a second task in each of the gateway and cloud network may be determined. The gateway may include available bandwidth and the processing times for each of the first task and the second task in the gateway and cloud network, respectively, in the determination of task allocation. The gateway may then initiate provision of the service at the gateway based on the allocation of the first and second tasks between the gateway and cloud network. In order to maintain efficient allocation of tasks between the gateway and cloud network as network conditions change, the gateway may profile the service during operation to determine at least one service parameter, determine a current latency of the service, determine whether the current latency of the service satisfies the desired latency; and, perform, if the current latency of the service does not satisfy the desired latency, a re-allocation of tasks of the plurality of tasks between the gateway and the cloud network based the desired latency and the at least one service parameter.

DETAILED DESCRIPTION

Figure 1A:
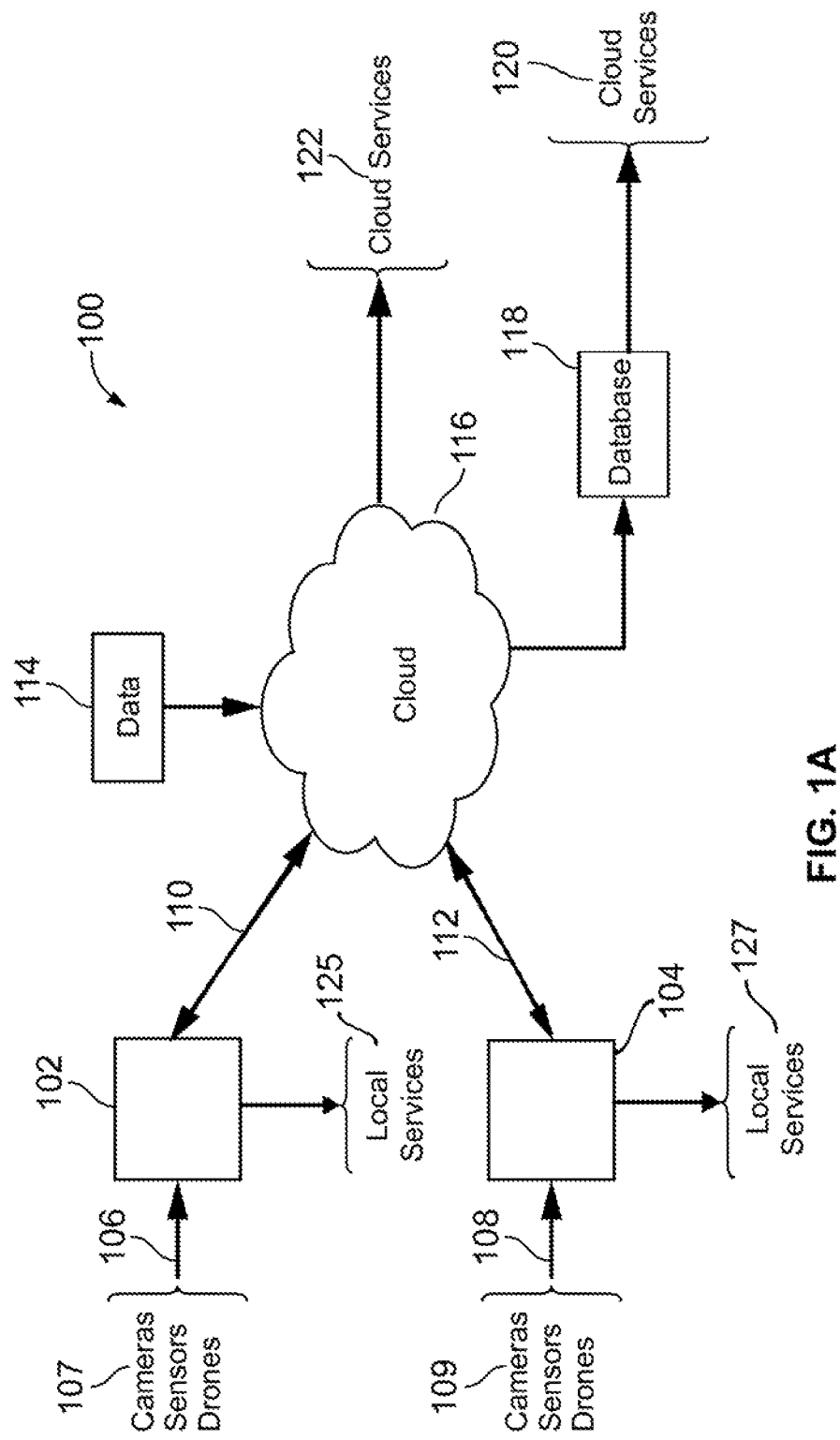
FIG. 1A is a simplified diagram illustrating an example system.

The system and method will now be described by use of example embodiments. The example embodiments are presented in this disclosure for illustrative, purposes, and not intended to, be restrictive or limiting on the scope of the disclosure or the claims presented herein.

Most Internet of Things (IoT) applications/services are heavily dependent on connection to the cloud for providing service. While the cloud connected IoT model for applications/services usually works well for connected homes or enterprises, the model often fails to provide adequate service in settings where Internet bandwidth is limited, for example by prohibitive expense or slow connections, or where the connection to the Internet is often lost or only intermittently available. These types of settings are referred to as weakly connected settings.

Furthermore, sending large data files such as videos over an Internet connection takes time, and may also cost more than sending conventionally sized data files. For example, these problems may be especially acute for IoT applications that use high volume data collecting devices such as UAVs that collect video data. A typical high definition. UAV video made during a 15 minute bight can commonly exceed a gigabyte (GB) in size. Sending an entire video of this size over a weak Internet connection for processing in a cloud network may take a long time. In the weakly connected setting, a user may find the time it takes to send such a large video file unacceptable because of the slow connection speed, or because the connection is only available intermittently. Services that utilize the video may then be degraded as far as service latency and quality of service. Other service relying on the same weak interact connection may also be degraded when the large video file is sent.

Also, while many IoT applications use a gateway implemented in a device such as a router in the home or in a local network, the functions of the gateway are typically provided only to bridge across different networking technologies, and/or relay data, including time critical and non-time critical data, from and to the cloud. In weakly connected settings, a local network connecting to the cloud using a gateway for relaying data that includes both time critical and non-time critical data may also suffer unacceptable performance degradation service because of slow connection speed, or because the connection is only available intermittently.

The embodiments of the disclosure provide methods and apparatus that allow efficient provision of services in a local network that includes a gateway connected to a cloud network in a weakly connected setting. The local network may include data sensors such as heat sensors, infrared sensors, moisture sensors, motion sensors, stationary cameras, chemical sensors, or any other type of sensor configurable to provide data about an environment to the gateway. The local network may also be configured to receive data from data sensors implemented in moving vehicles or remote controlled vehicles. For example, the local network may be configured to receive video data from a video camera implemented in a drone, i.e., an unmanned aerial vehicle (UAV).

The embodiments provide an advantage over existing gateways. The gateway of the embodiments implements a web service in the local network, which provides unique services that are different from the web service offered in the cloud and accessible even if an internet/cloud connection is not available. The gateway can be configured to operate offline (i.e., with no internet/cloud connection) and still offer the most critical services.

Also, the gateway may provide a unique feature-based compression technology that allows the cloud to maintain video backup without actually storing UAV videos. The compression of video data in the gateway allows video information to be sent to the cloud without requiring the large bandwidth that would be required by whole video files. The embodiments achieve this compression by converting a UAV video file into an orthomosaic, which is a seamless geographically referenced panoramic overview of a geographic area. An orthomosaic is typically one order of magnitude more compact than the full resolution video. The orthomosaic provides a high resolution visual summary of the geographic area from a low altitude vantage point, revealing minute details. A gateway user can interactively navigate the seamless stitched imagery of the orthomosaic, zooming in and out, panning and rotating the view for carrying out a detailed visual inspection of the a geographic area. An orthomosaic may also be used in both of the gateway and cloud network to generate precision maps used for services. Multiple types of precision maps may be generated, each for a different service.

Use of the disclosed embodiments allows more efficient service provision in the local network through flexible allocation of tasks between resources in each of the gateway and cloud network, and through flexible management of data communications between the gateway and cloud network. The allocation of tasks and management of data communications may be based on a desired latency for a particular service that is provided by the local network, while taking into account the conditions of the weakly connected setting. For example, available bandwidth, processing time for computational tasks in each of the gateway and the cloud network, and time constraints for transferring different types of data may be taken into account. The conditions of the weakly connected setting, as the conditions vary over time, may also be taken into account in order to dynamically allocate tasks and manage data communications between the gateway and cloud network as services are provided.

A gateway according to the embodiments may be configured to efficiently provide one or more services in a local network, or enable one or more services supported by the cloud network, where the one or more services in the local network or cloud network may each be configured for a weakly connected setting. The configuration of the services may include allocation of services tasks between the local network and cloud network while taking into account conditions such as available bandwidth of the weakly connected setting and criticality of the service to a user. Tasks of services that require a fast service time or are critical to the user in the local network (i.e., cannot go down when interact/cloud connections are lost) may be performed within the local network if the latency requirements may be met. Tasks of services that require a less stringent service time or are less critical to the user and that are provided to a user of the local network may be performed in both of the local network and cloud network if the latency requirements may be met. Implementations of the embodiments also allow the dynamic adaption of services as available bandwidth for communications between the local network and cloud network changes.

Other implementations allow dynamic allocation of tasks for services based on processing and bandwidth load on the gateway when multiple services are being operated. Different types of data that are to be communicated between the local network and the cloud network may also be assigned different priorities. For example, a priority of non-time sensitive, intermediate-time sensitive, or time sensitive may be assigned to data according to task/service criticality or desired service latency. This allows the most critical data of services being performed to be communicated in the weakly connected setting between the local network and the cloud network on a priority basis.

FIG. 1A is a simplified diagram illustrating an example system implemented according to an embodiment of the disclosure. FIG. 1A shows a system 100 that includes gateways 102 and 104. Gateways 102 and 104 may be configured to communicate with cloud network 116 over, respectively, links 110 and 112. Links 110 and 112 may each comprise, for example, a hypertext transfer protocol (HTTP) or advance messaging queuing protocol (AMQP) connection implemented over a local internet/cloud interface such as a Wi-Fi connection. Gateway 102 may receive data 106 from devices such as cameras, sensors or UAVs 107, over a wireless interface implemented using television white space (TVWS) spectrum, Wi-Fi spectrum, or any other suitable wireless spectrum. Gateway 104 may receive data 108 from devices such as cameras sensors or UAVs 109, over a wireless interface implemented using television white space (TVWS) spectrum, Wi-Fi spectrum, or any other suitable wireless spectrum. Use of TVWS spectrum, which is in the lower frequencies, allows signals to propagate much farther than signals in 2.4 GHz or 900 MHz of the spectrum. TVWS signals also may propagate through the leaves and crop canopies of a remote environment. The cameras, sensors or UAVs 107 and 109, may communicate the data to gateways 102 and 104, respectively, using protocols such as MQ telemetry transport (MQTT), transport control protocol (TCP), or file transfer protocol (FTP), depending on the configurations of the particular cameras, sensors or UAVs that are used. In the example of FIG. 1, the gateway 102 and cameras, sensors or UAVs 107 may comprise a local network, and gateway 104 and cameras, sensors or UAVs 109 may comprise a separate local network.

In an implementation of system 100, each of gateways 102 and 104 may comprise a gateway that is located in a weakly connected setting, i.e., in a setting in which connections over the local internet/cloud interface for links 110 and 112 are only available intermittently, and/or are only available with poor quality, or low speed/low bandwidth connections. Gateways 102 and 104 may be located remotely from one another. Each of gateways 102 and 104 may provide services 125 and 127, respectively, though user interfaces and/or connected devices for users located in the service area of the particular gateway. The services 125 and 127 may include local services that do not require communication with cloud network 116. The services 125 and 127 may also include local services that require communication with cloud network 116. Use of data from gateways 102 and 104 may also enable creation of data base 118 and provision of cloud services 120 and 122 to users located throughout system 100 remotely from gateways 102 and 104. Services 120 and 122 may also be used by users located in the service area of one of the particular gateways 102 or 104 through data communications between gateway 102 and cloud network 116. For example, data that is communicated to the cloud network 116 from gateway 102 may be combined with data from gateway 104, and other similar gateways, in the cloud network 116 in order to provide enhanced cloud based services 120 and 122 to the users located in the service areas of each gateway 102 or 104. Cloud service 120 and 122 may also be provided to users located remotely from gateways 102 and 104. Data that is communicated to the cloud network 116 from gateways 102 and gateway 104 may also be combined with other data 114, such as weather data, in the cloud network 116 in order to provide the enhanced cloud based services 120 and 122.

System 100 has application in situations in which there is only a weakly connected communications interface available for connecting a gateway or device to the cloud. These situations may include situations in which a gateway is operated in a remote location within which only intermittent or low quality/low bandwidth data connections are available, or where high quality/high bandwidth data connections are prohibitively expensive. For example, system 100 may have application for use in providing services to operations such as mining, mapping, geographical research, oceanography, environmental research, forestry, security, surveillance, or agriculture.

Figure 1B:
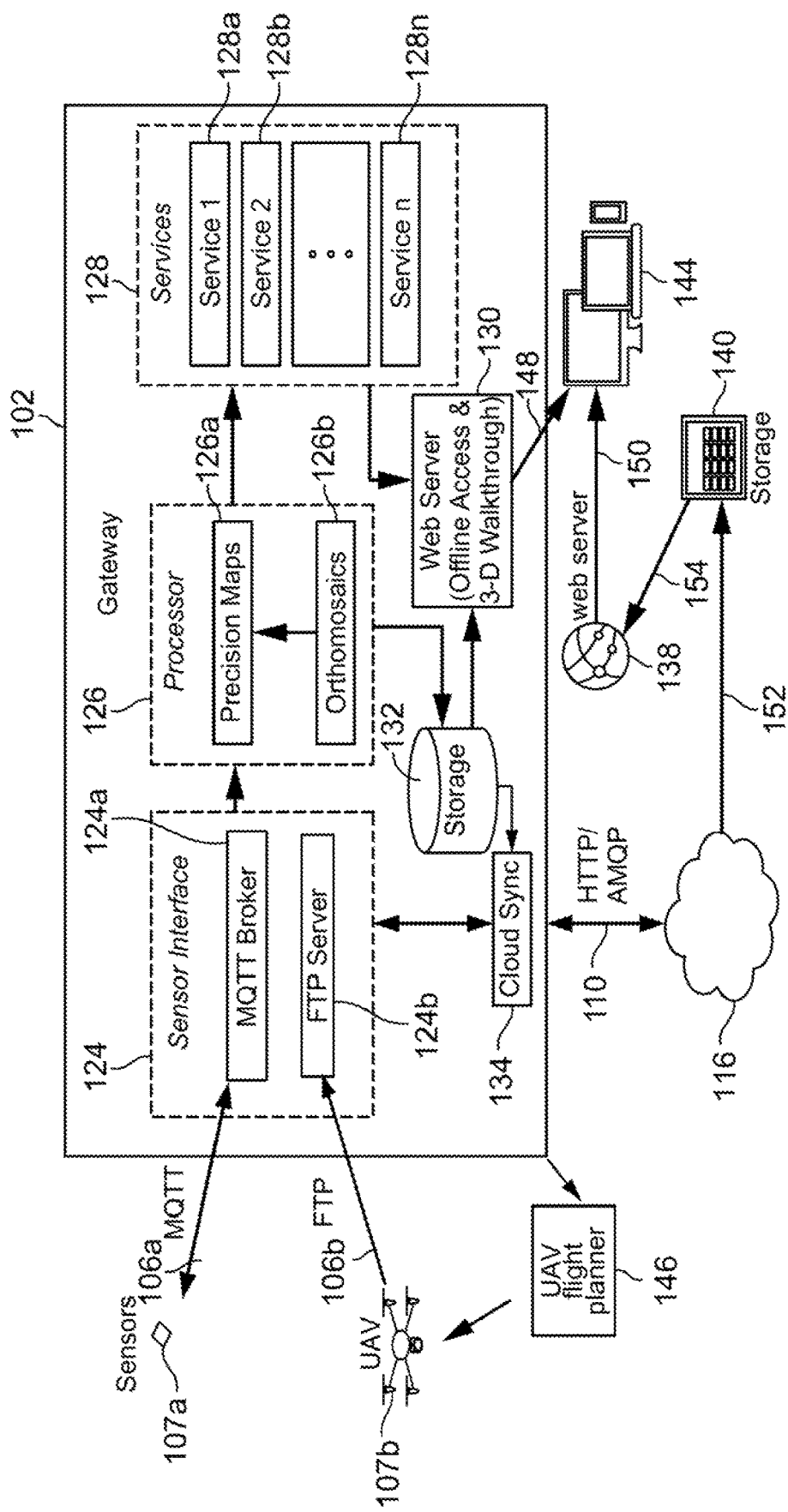
FIG. 1B is a simplified diagram illustrating portions of an example gateway.

FIG. 1B is a simplified diagram illustrating portions of an example gateway. Gateway 102 of FIG. 1B illustrates an example implementation of gateway 102 of FIG. 1A. Gateway 102 may include sensor interface 124, processor 126, service functions 128, web server 130, storage 132, and cloud sync 134. Sensor interface 124 includes MQTT broker 124a for communicating with one or more environmental sensors 107a over a MQTT link 106a. Sensor interface 124 also includes FTP server 124b for receiving video files from a sensor implemented as one or more video cameras on UAV 107b over FTP link 106b.

Gateway 102 may also be connected to a UAV flight planner 146 implemented in a computing device. For example, UAV flight planner 146 may be implemented as an application in a smartphone, tablet computer, laptop computer or desktop computer connected to gateway 102 by a Wi-Fi or other type of connection. UAV flight planner 146 may communicate with, and control, UAV 107b over a radio control link configured in the device in which the UAV flight planner 146 is implemented. UAV flight planner 146 may also communicate with, and control, UAV 107b through gateway 102, for example over FTP link 106b. In an alternative implementation, UAV flight planner 146 may be implemented as part of gateway 102. Webserver 130 of gateway 102 may also be connected to one or more devices 144 through, for example, a Wi-Fi link 148 to allow gateway 102 to provide local network services to a user of devices 144 without requiring a cloud connection(i.e., while offline). Gateway 102 also may be connected to the cloud network 116 though HTTP/AMQP link.110. The Cloud network 116 may provide cloud services, such as services 120 and 122 of FIG. 1A, based on the data received from gateway 102 and/or received other gateways. Devices 144 may also provide users access to a remote webserver 138 to allow users to access services 120 and 122 provided by the cloud network 116 when internet/cloud connections are available. The link 150 from devices 144 to webserver 138 may be implemented over the same weakly connected local Wi-Fi internet/cloud interface as is HTTP/AMQP link 110. Cloud network 116 may also include a connection to a global storage 140 that stores data for use by services 120 and 122.

In an example implementation, gateway 102 may be implemented in an agricultural setting. In the agricultural service setting, gateway 102 may be implemented as a gateway connecting a local network to the internet/cloud. The local network may comprise sensors 107a and UAV 107b from which gateway 102 receives data. In one example implementation, the local network may provide agricultural services to the owner of a farm within which the local network including gateway 102 is configured.

The local network may be configured for efficient provision of services despite a lack of inexpensive internet/cloud connectivity in the fields, and despite a slow and unreliable network connection to cloud network 116 from elsewhere in the local network, for example, from the farmer's house or office. Services may be provided using a task allocation and data transfer scheme between gateway 102 and cloud network 116 that allows for efficient provision of both local services 125, and cloud services 120 and 122 in the weakly connected setting. The gateway 102 may be used to construct a dynamic, precision map that captures and presents the temporal variations of various environmental parameters on an area of land on a farm. Various sets of data may also be backed up in storage 132 for sending to the cloud network 116 to enable cross-farm (i.e., between different farms) and long-term analytics performed in the cloud network 116. The various sets of data may be queued for sending to the one or more cloud network base on assigned priorities that allow for efficient provision of both local 125 and cloud services 120 and 122 given the weakly connected setting. The task allocations and the various sets of data may be configured to avoid sending large data sets on the weakly connected setting.

In an implementation, environmental sensors 107a of the farm network may be deployed throughout an area of the farm such as in crop fields or livestock grazing areas. UAV 107b may be deployed to flyover the crop fields or livestock grazing areas to take aerial view videos of the area. In one implementation, environmental sensors 107a and UAVs 107b may communicate on channels in the television white space (TVWS) to a base station that relays the data to gateway 102 over a local Wi-Fi connection. Gateway 102 may be implemented as a PC form factor device and be placed in the farmer's house or office within a location with internet access. To avoid sending entire UAV generated videos to the cloud, and far a low-latency response, the gateway 102 may perform significant local computation. The TVWS Base Station, may be co-located with the gateway 102 provide network connectivity to sensors 107a within a radius, for example, of up to 5 miles.

Figure 2:
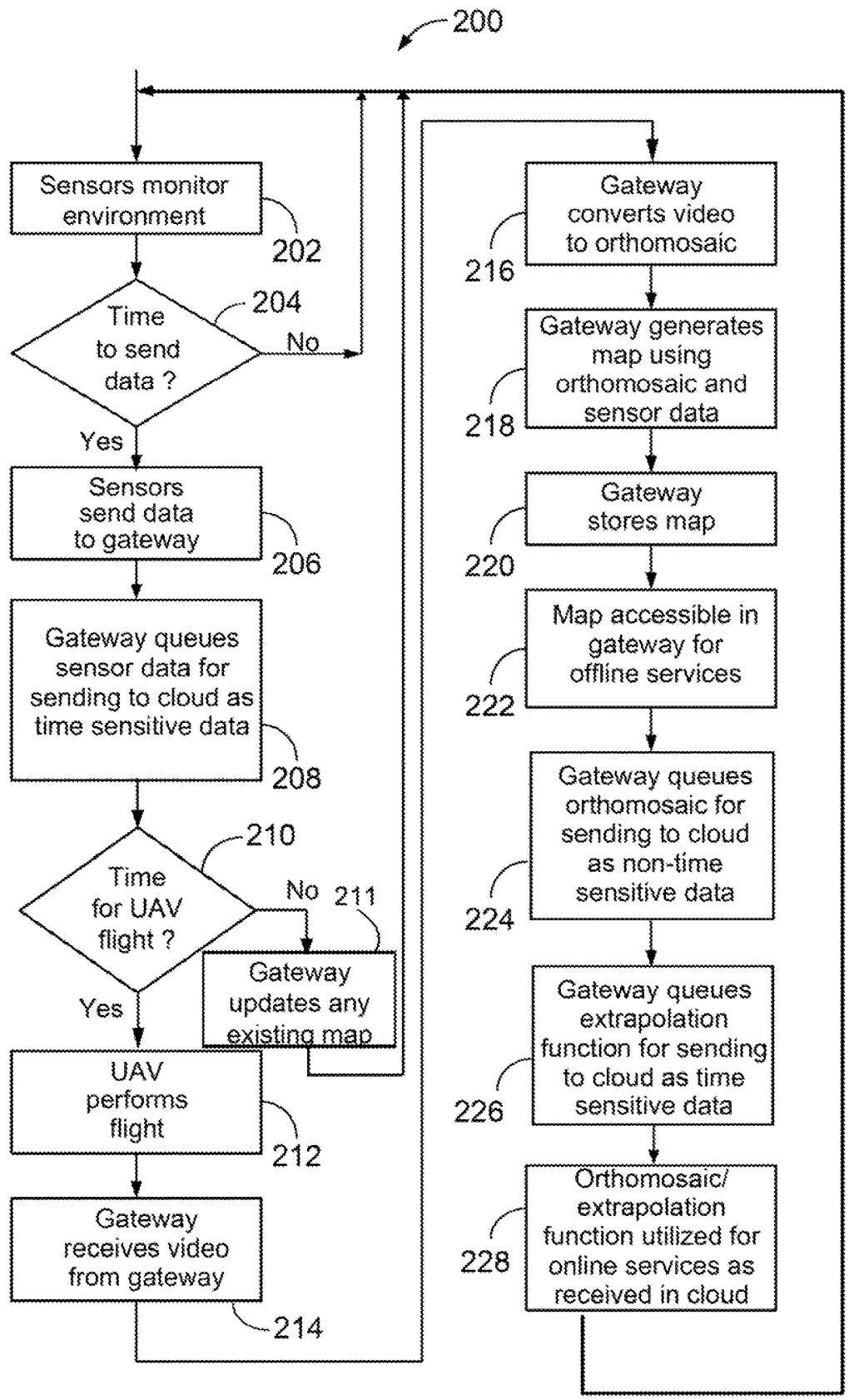
FIG. 2 is a flow diagram illustrating operations performed in the example gateway of FIG. 1B.

FIG. 2 is a flow diagram illustrating operations performed in an example gateway according to the embodiments. FIG. 2 may be explained with reference to gateway 102 of FIGS. 1A and 1B. The process begins at 202 where sensors 107a monitor the environment of an area in which the sensors 107a are located. Sensors 107a may be used to monitor soil temperature, moisture, soil pH, etc., in the proximity of each of the sensors 107a and generate sensor data. At 204, sensors 107a determine if it is time to send the monitored sensor data to gateway 102. The sensor data may be sent to gateway 102 at predetermined times, for example every 10 minutes, or at any other periodic or irregular time schedule as appropriate to collect relevant data. If is determined that it is not time to send the sensor data to gateway 102, the process repeats operations 202 and 204 until it is time to send the sensor data. If it is determined that it is time to send the sensor data to gateway 102 the process moves to 206.

At 206, sensors 107a send the monitored sensor data to gateway 102 over MQTT interface 106a. Gateway 102 receives the sensor data from the sensors 107a at MQTT broker 124a in sensor interface module 124. At 208, gateway 102 queues the sensor data in storage 132 for sending to cloud network 116 by cloud sync function 134 when a cloud connection for sending the sensor data is available. In an implementation, the sensor data may be assigned a time sensitive priority. The time sensitive priority causes cloud sync function 134 to send the sensor data on a priority basis relative to other data having a lower priority when a cloud connection is available. In a weakly connected setting, this causes the sensor data to be sent to cloud network 116 with a preferred priority when a connection is only intermittently available or of low quality low speed bandwidth. Cloud network 116 may then use the sensor data for time critical analysis. For example, the sensor data may be used to update previously generated and/or stored data used in online services 120 and 122. For example, if sensors 107 monitor conditions that change quickly, such as moisture or temperature, updated sensor data will allow cloud network 116 to use current sensor data for analysis and provide up to date analysis through services 120 and 122 as quickly as possible. Because the sensor data will require relatively less bandwidth than other data such as video data, the sensor data may be easier to transmit without error or interfering with other data transmissions in the weakly connected setting. The sensor data may be sent at a priority and frequency that allows combining with and/or updating of other data in the cloud network that changes less frequently and is sent at a lower frequency to the cloud network.

At 210, gateway 102 determines if it is time to send UAV 107b on a flight to collect video data over the area in which sensors 107a are located. If it is determined that it is not time for a UAV flight, the process moves to 211. At 211 gateway 102 uses the sensor data to update any existing precisions maps stored in gateway 102 that rely on updated sensor data for services 128. Next, the process returns to 202 and sensors 107a monitor the area in which the sensors 107a are located.

If, however, it is determined at 210 that, it is time for a UAV flight, gateway 102 sends a notification to UAV flight planner 146. In an implementation, the UAV flights may be initiated by gateway 102, or another device communicating with gateway 102 in the local network, on a predetermined basis, for example once or twice every 24 hours or several times a week. In another implementation, the UAV flights may be initiated by receipt of user input at a device in which UAV flight planner 146 is installed, such as, for example, computer device 144 when a user desires to collect video data.

At 212, UAV 107a is flown over the area in which sensors 107a are located to record a video of an aerial view of the area. The flight of UAV 107a may be directed by a user of UAV flight planner 146 or may be an automatically controlled flight. When the flight is completed, at 214, UAV 107a sends video data, including the video captured during the flight to gateway 102. Gateway 102 receives the video data over FTP interface 106b at FTP server 124b of sensor interface 124. The video data is then input front sensor interface 124 to orthomosaic converted 126b of processor 126. At 216, the video data, which may comprise several gigabytes of data, is converted by orthomosaic function 126b into an orthomosaic that comprises a compact representation of an aerial view RGB color image of the area in which the sensors 107a are located. In one example implementation, the orthomosaic may be constructed from the UAV video using aerial 3D mapping, or, image stitching and mosaicking. In another implementation, a hybrid technique which combines key components from both 3D mapping and mosaicking methods may be used to construct the orthomosaic. For example, techniques from aerial 3D mapping may be used to estimate the relative position of different video frames without computing expensive high resolution digital surface maps. This allows the inaccuracies due to non-planar nature of the farm to be removed. Once the relative positions have been computed, the images may be stitched together using mosaicking techniques to generate the orthomosaic.

At 218, the orthomosaic is input to the precision map function 126a in processor 126 of gateway 102. Precision map function 126a uses the latest sensor data, received at 204, along with visual features in the orthomosaic, to determine a function for extrapolating the sensor readings to create an existing precision map or update an existing precision map. Each time the gateway receives a new video data precision map function 126a makes adjustments to the function for extrapolating the sensor readings. Precision map function 126a then uses the orthomosaic RGB color image together with the latest sensor data to generate one or more precision maps of a desired area of the farm. Precision map function may also generate predictions for the entire farm. For example, sensors that observed soil temperature at the discrete locations of sensors 107a allow processor 126 to make predictions about every location in the farm. This may be done by considering spatial proximity as well visual similarity of the locations to the sensors 107a. Visual similarity may be determined by analyzing spatial and visual smoothness. Areas that have similar spatial and visual smoothness may be considered to have similar sensor readings. The precision maps may comprise a moisture map, pH map, temperature map, or a map of other environmental or physical characteristics of the desired area.

At 220, processor 126 stores the one or more precision maps in storage 132. At 222, processor 126 also provides the one or more precision maps to service function 128 where the one or more precision maps are accessible in the gateway for off-line services. The precision maps may then be accessed and utilized by service function 128 to provide off-line services 125 in the local network. Service function 128 may include service(1) 128a through service(n) 128n, each of which may be a service that utilizes a precision map. For example, a precision map may be used to provide services by generating information to a user about what tasks need to be performed, and where the tasks need to be performed on the farm. In an example implementation, an irrigation service may utilize a moisture map to provide information about the amount of water to use for irrigation on different pans of the farm. In another example, a precision pH service may utilize a pH map to provide information or recommendations about how much lime to apply on different parts of a farm to reduce the acidity of the soil in those regions.

At 224, processor 126 also queues the orthomosaic in storage 132 for sending to cloud network 116 by cloud sync function 134 when a cloud connection for sending the orthomosaic is available. In an implementation, the orthomosaic may be assigned non-time sensitive priority. The non-time sensitive priority causes cloud sync function 134 to send the orthomosaic on a low priority basis when a cloud connection is available. In a weakly connected setting, this causes the orthomosaic to be sent to the cloud network 116 with a low priority when the connection is intermittent or of low quality/low speed bandwidth. Cloud network 116 may then use the orthomosaic to generate an updated precision map for online services 120 and 122.

At 226, processor 126 also queues any updated data/information associated with the function for extrapolating the sensor readings in storage 132 for sending to cloud network 116. In an implementation, the data/information associated with the function for extrapolating the sensor readings sensor may be assigned a time sensitive priority for sending to the cloud network 116. In a weakly connected setting, this causes the data/information for extrapolating the sensor readings to be sent to cloud network 116 with a preferred priority when the connection is intermittent or of low quality/low speed bandwidth. Cloud network 116 may then use the data/information associated with the function for extrapolating the sensor readings for time critical analysis by updating mosaics and sensor data currently being used in cloud network 116 for providing services. For example, if sensors 107a monitor conditions that change quickly, such as moisture or temperature, updated data/information associated with the function for extrapolating the sensor readings will allow cloud network 116 to use current data/information associated with the function for extrapolating the sensor readings for analysis and provide up to date analysis. The data/information associated with the function for extrapolating the sensor readings may be assigned the preferred priority based on that data requiring less bandwidth and be easier to transmit without error or interfering with other data transmission in the weakly connected setting.

At 228, the cloud network 116 may provide online services 120 and 122 utilizing sensor data, the data associated with the function for extrapolating the sensor readings, and the orthomosaic received from gateway 102.

The Cloud Sync component ensures that the relevant data is backed up in the cloud for data access outside the agricultural network (e.g., when the farmer is travelling), for long term studies, and for cross-farm analytics. Because the video data received from the UAV is large in size, and the internet/cloud connection is weak, the UAV video data is not sent to the cloud. The video data may be kept in local storage 132 for a predefined duration, after which the video data may be deleted. In other implementations, additional levels of priority may be used for queuing data for sending from gateway 102 to cloud network 116. For example, a level of intermediate time sensitive, which has may have a priority between time sensitive and non-time sensitive, may be assigned.

In the implementation of FIG. 2, the allocation of the tasks, such as conversion of video data to the orthomosaic, the generation of the extrapolation function, and the generation of the precision map within gateway 102 and/or cloud network 116, may be based on latency requirements for the various off-line local services 125 and online cloud services 120 and 122. The priority of the data, such as the sensor data, the orthomosaic, and the data on the extrapolation function, stored in storage 132 for queuing to be sent to cloud network 116 may also be based on these latency requirements. For example, local services 125, which are relevant for the farm in which gateway 102 is implemented, may require low latency and also need to be provided using as accurate data as possible. The information provided by local services 125 on the spot may be critical to the hour by hour, or day to day, operation of the farm. Information regarding irrigation, fertilizing, or livestock/animal movements or health, etc., specific to the area in which gateway 102 is implemented may be updated and provided as quickly and accurately as possible through local service 125, even if internet/cloud connections are not available. Additionally, the information or direction provided by cloud services 120 and 122 may not require as low of a latency as is required by local services 125. For example, information or direction that relies on global or regional agricultural data from gateway 102 as combined with data from other agricultural gateways may not require a low latency as far as updating data received from gateway 102.

The allocation of the tasks, such as conversion of video data to the orthomosaic, the generation of the extrapolation function, and the generation of the precision map to gateway 102 prevents local services 125 from being negatively affected by the loss the internet/cloud connection. It also prevents local services 125 from being negatively affected by low quality/low bandwidth internet/cloud connections. The priorities for sending of the data to cloud network 116, such as the sensor data, the orthomosaic, and the data on the extrapolation function, may be assigned so that cloud services, which require particular data to be current, receive that data with a priority over other data. For example, data used in cloud services 120 and 122 for an owner of the agricultural area or farm in which gateway 102 is implemented, and that is related to irrigation, fertilizing, or livestock/animal movements or health, etc., may be given a higher priority for sending to the cloud network than other data less critical for providing services 120 and 122. This is illustrated in the implementation of FIG. 2, where the sensor data 107a is given higher priority for sending to cloud network 116. The precision map generated in the cloud network 116 may be updated using the sensor data each time the sensor data is received. In order to save bandwidth in the weakly connected setting, the orthomosaic may be sent with a lower priority to cloud network 116. Also, the orthomosaic is compressed as compared to the precision map so the precision map is not sent from gateway 102 but is generated separately in cloud network 116. In various implementations, the allocation of tasks to gateway 102 and the priorities with which data is sent to cloud network 116 from gateway 102 may be configured to provide an overall service latency balance between local services 125 and cloud services 120 and 122. The latency balance may be one that is acceptable to the needs of a user of gateway 102. The allocation of tasks to gateway 102, and the priorities with which data is sent to cloud network 116 may also be configured to provide robust and reliable local service while gateway 102 and cloud network 116 are communicating on the intermittent low quality/low bandwidth connection in the weakly connected setting.

Figure 3B:
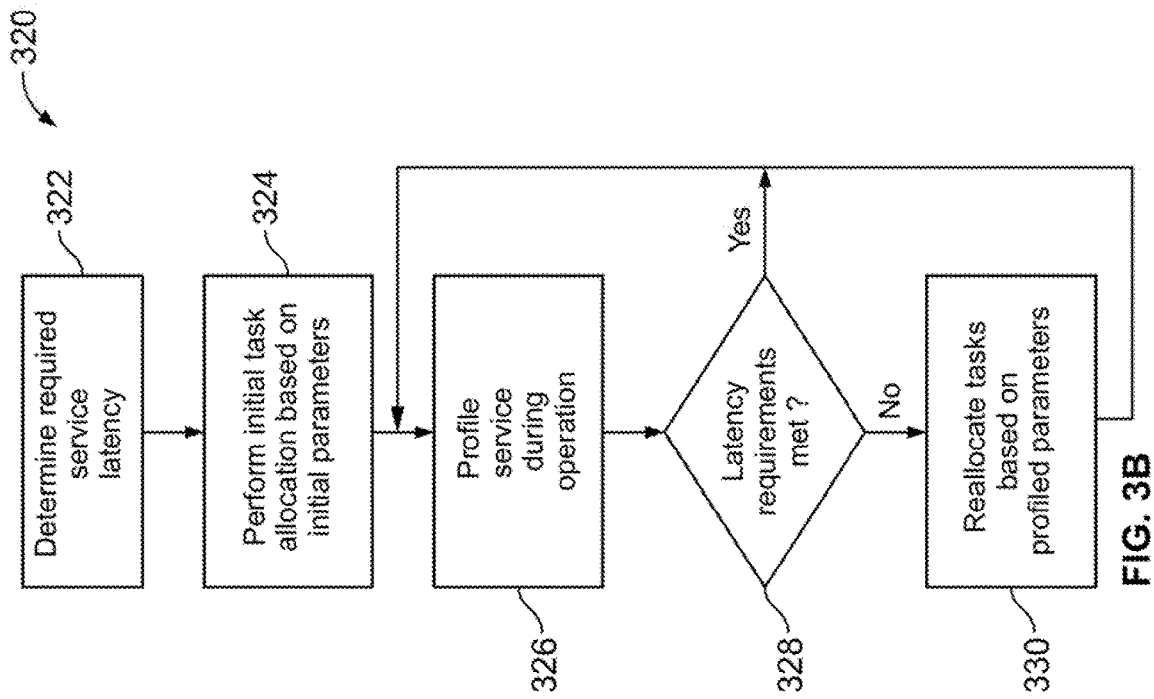
FIG. 3B is flow diagram illustrating operations performed in an example system for task allocation between a gateway and a cloud network.
Figure 3A:
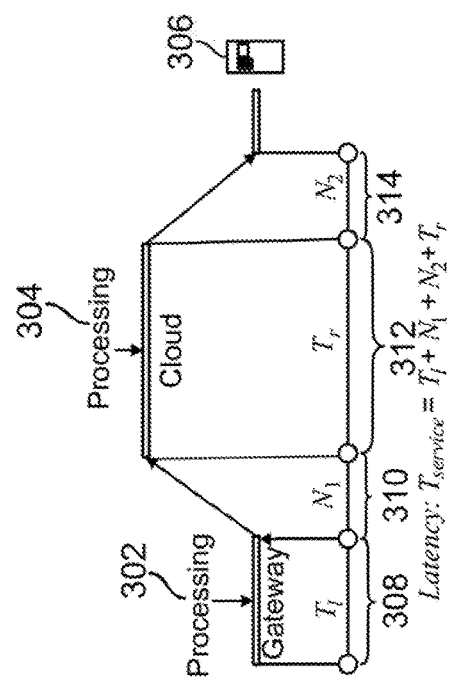
FIG. 3A is a diagram illustrating latency for a service in an example system including a gateway communicating with a cloud network.

FIG. 3A is a diagram illustrating latency of a service in an example system including a gateway communicating with a cloud network. FIG. 3A shows the Latency or time of service ($T_{service}$) for an example service. The service may be any type of service supported by a network such as network 100 of FIG. 1A. $T_{service}$ may be determined as a sum of parameters including the time of service $T_1$ 308 for processing tasks 302 performed in the gateway, a data transfer time $N_1$ 310 (bandwidth between the gateway and a cloud network), a time of service $T_r$ 312 for processing tasks 304 performed in the cloud network, and a data transfer time s $N_2$ 314 (bandwidth between the cloud network and user's device 306 that receives service output results). The equation for calculating service latency is as follows:

Latency: $T_{service} = T_1 + N_1 + N_2 + T_r$

Figure 4A:
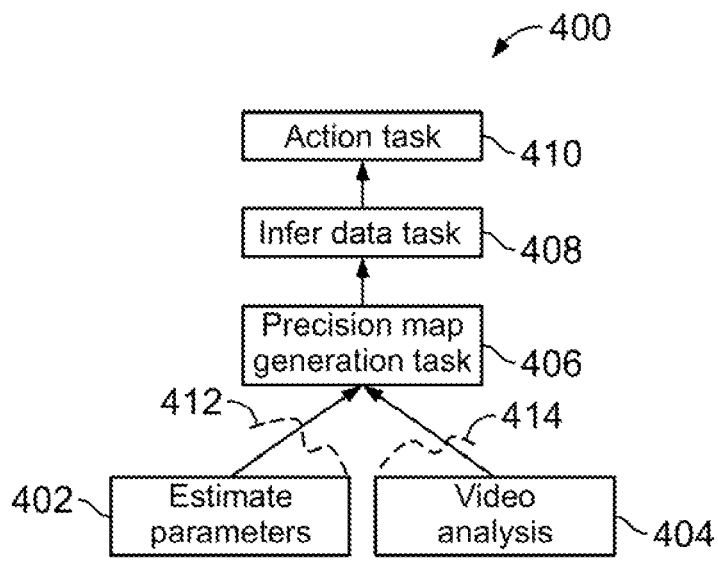
FIG. 4A is a simplified block diagram illustrating example tasks of a service in an example system including a gateway and a cloud network; and, FIG. 4B is a simplified block diagram illustrating example task allocation between a gateway and a cloud network.
Figure 4B:
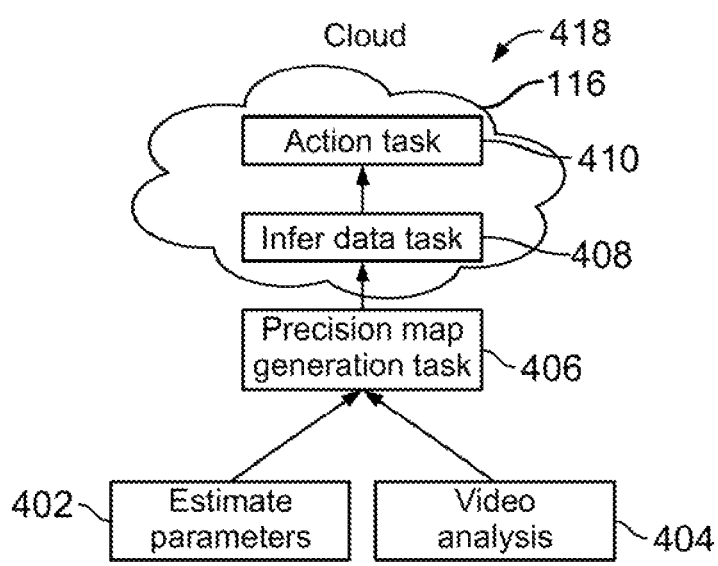

FIG. 3B is flow diagram illustrating operations performed in an example implementation of an apparatus for task allocation between a gateway and a cloud network. FIG. 4A is a simplified block diagram illustrating example tasks of a service in an example system including a gateway and a cloud network, and, FIG. 4B is a simplified block diagram illustrating example task allocation between a gateway and a cloud network In an example implementation, the operations of FIG. 3B may be performed by an apparatus and programs configured in a gateway such as 102. For example, the operations may be performed using processor 126 and programs in storage 132. In other implementations, the apparatus may be implemented in cloud network 116 or in a computing device such as computing devices 144.

The process of FIG. 3B begins at 322 where the processor 126 determines service latency requirements for a service. The latency requirements may define a maximum time of service that is allowed or that can be tolerated by a user of the service located at gateway 102. The latency requirements may be determined based on various considerations such as the criticality of the service to a user of gateway 102. The data; information that is included in outputs generated by the service and/or types of actions the user performs based on the service outputs may also be considered for the latency requirements. The need for the service to provide information/results to the user locally at the gateway, so the user can take action within a certain time frame, may also be taken into account.

At 324, processor 126 performs initial task allocation of the service tasks based on available initial parameters. In the implementations of FIG. 3B, the initial parameters may include previously measured or estimated values for task processing times and bandwidth of the connection between the gateway 102 and cloud network 116. Each task of the service may have a separate task processing time for performance of the task in each of the gateway 102 and cloud network 116. For example, a service may include tasks such as those represented in FIG. 4A. FIG. 4A shows service tasks 400 that included include "estimate parameters" 402, "video analysis" 404, "precision map generation" 406, an "infer data task" 408, and an "action task" 410. Depending on the gateway configuration, each of these tasks may be performed in either of the gateway 102 or cloud network 116. FIG. 4B may be considered an inference graph, with each task shown as a module that encapsulates part of the service. Edges (u, v) 412 and 414 represent that module a depends on module v. For example, edge (u, v) 412 represents that precision map generation depends on estimate parameters 402, and edge (u, v) 414 represents that precision map generation depends on video analysis 404. Results (inference values) flow on edges such as edges 412 and 414.

The operation at 324 may be performed by determining a graph partitioning policy optimized for latency using the parameters of $T_v^l$ (the computing time of v at the gateway), $T_v^r$ (computing time of v in the cloud network), and $B_{u,v}$ (network latency of transfer of u's state to v).

$$\Sigma_{v \in V}(1-l_v) \times T_v^l + (l_v \times T_v^r) + \Sigma_{(u,v) \in E}[(|l_v - l_u|) \times B_{u,v}] \leq L$$

Where $l_v = 1 = 0$ means execute locally,
and, $l_v = 1$ means execute remotely In operation 324, processor 126 may determine the task allocation based a task graph partitioning optimized for latency as performed above. FIG. 4B shows an example allocation 418 of the tasks shown in FIG. 4A as may be allocated in operation 324. FIG. 4B shows an example result in which estimate parameters 402, video analysis 404, and precision map generation 406 are allocated to gateway 102, and, infer data task 408 and action task 410 are allocated to cloud network 116.

Next, at 326, processor 126 profiles the service during operation of the service where the service tasks are allocated as in operation 324. In an implementation, processor 126 may receive data from cloud network 116 on tasks being performed in the cloud network 116. For example, the profiling may be performed by monitoring parameters of the service, such the time of service $T_l$ 308 for each processing task 302 performed in the gateway, a data transfer time $N_1$ 310 (bandwidth between the gateway and a cloud network), a time of service $T_r$ 312 for each processing task 304 performed in the cloud network. The profiling at 326 may also monitoring/measuring the actual overall latency or time of service for the service being profiled, in the example of FIG. 4B the profiling may include measuring/monitoring the processing time of each of the tasks of estimate parameters 402, video analysis 404, precision map generation 406 in the gateway 102, and, infer data task 408 and action task 410 in the cloud network 116.

At 328, processor 126 determines if the latency requirements for the service that were determined at 322 are being met during operation of the service. If the latency requirements are being met the process moves to 326 and continues monitoring/measuring parameters of the service. If the latency requirements are not being met the process moves 330.

At 330, processor 126 reallocates service tasks based on the profiled parameters. The reallocation at 330 may be performed in a similar manner to the initial allocation performed at 324, but using updated values of the parameters as measured/monitored by the profiling of 326. For example, for each task v, $T_v^l$ (the computing time of v at the gateway), $T_v^r$ (the computing time of v in the cloud network), and $B_{u,v}$ (network latency of transfer of u's state to v) may be updated with profiled values from 326. An updated allocation may then be configured for service operation. The process then returns to 326 where the updated task allocation is profiled by processor 126 during service operation. The service may continue in operation using the updated service until a determination is made at 328 that latency requirements are not being met. The process will then generate a new task allocation and repeat operations 326, 328 and 330 as required.

Figure 5:
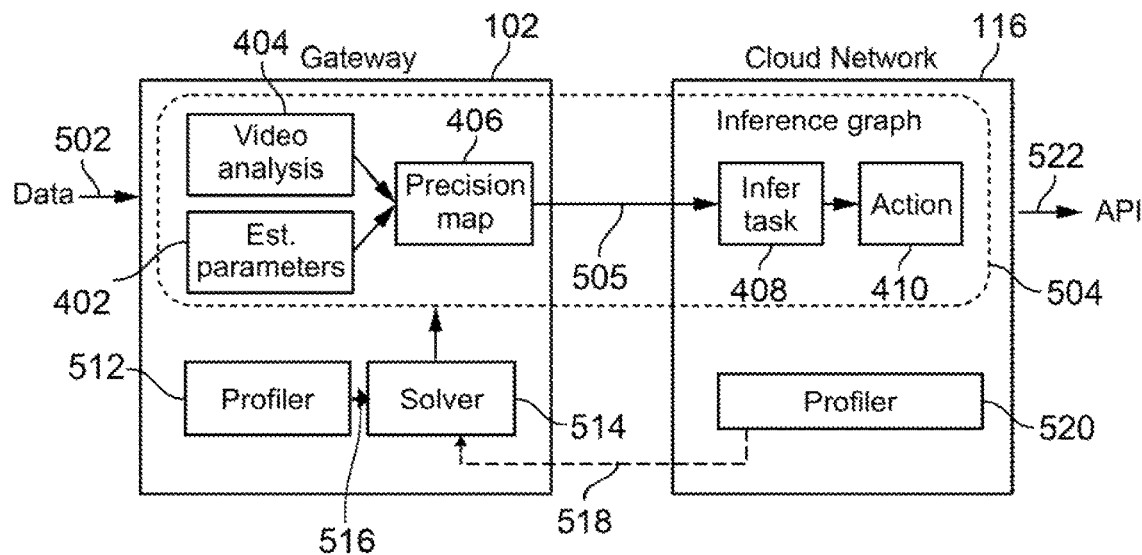
FIG. 5 is a simplified block diagram illustrating an example system in which tasks are allocated according to the operations of FIG. 3B; and, FIG. 6 is a simplified block diagram illustrating an example gateway.

FIG. 5 is a simplified block diagram illustrating an example system configuration in which tasks have been allocated according to the operations of FIG. 3B FIG. 5 shows an example configuration of a gateway 102 communicating with cloud network 116 according to the configuration result of FIG. 4B. Inference graph 504 may be created to include the tasks of estimate parameters 402, video analysis 404, and precision map generation 406 in the gateway 102, and, infer data task 408 and action task 410 in the cloud network 116. Gateway 102 may include profiler 512 and solver 514. Cloud network 116 may include profiler 520.

Gateway 102 receives data 502 from sensors, such as sensor data from sensors 107a and video data from UAV 107b, and performs the tasks of estimate parameters 420, video analysis 404, and precision map generation 406 in the gateway 503. The task results are then sent with data 505 to cloud network 116 to be further processed. For example, the task results data 505 may include the orthomosaic and data/information associated with the function for extrapolating the sensor readings as describe for the operations of FIG. 2. The task results may be sent as non-time sensitive data. The time sensitive sensor data may also be sent to cloud network 116 as described for the operations of FIG. 2.

Profiler 512 provides monitored/measured parameter information 516 to solver 514 as gateway 102 operates. Profiler 520 in cloud network 116 provides monitored/measured parameter information 518 to solver 514 as gateway 102 operates. Parameter information 518 may be sent to gateway 102 as non-time sensitive data. Solver 514 then may utilize the monitored/measured parameter information 516 and 518 to determine whether a reallocation of tasks is needed to meet a desired latency.

Figure 6:
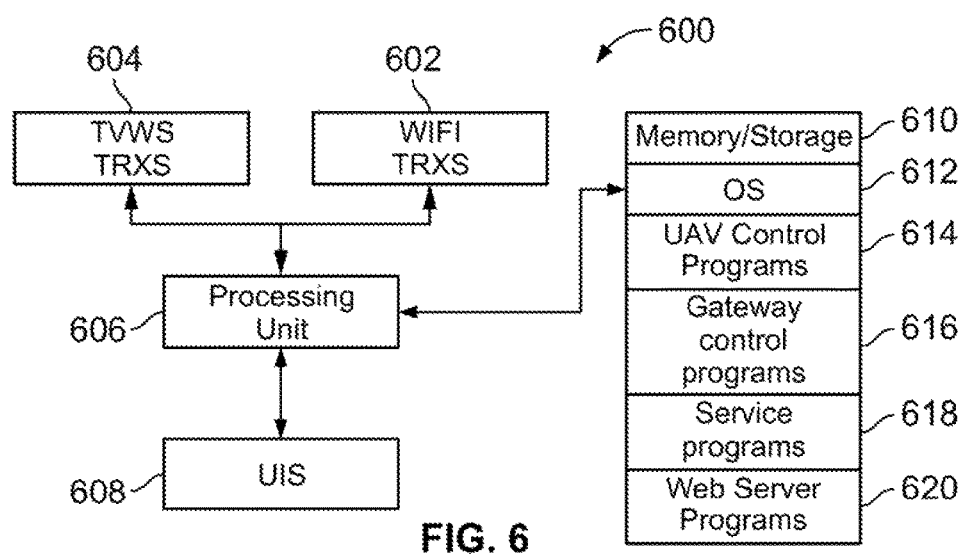

FIG. 6 is a simplified block diagram of an example gateway 600. The functions of gateway 600 may be implemented in an apparatus such as gateway 102 of FIG. 1B. Gateway 600 may include a processing unit 606, memory/storage 610, TVWS transceivers (TVWS TRXS) 604, Wi-Fi transceivers (Wi-Fi TRXS) 602, and user interfaces (UIS) 608. Wi-Fi TRXS 602 may support communications such as communications with cloud network 116 and computing devices 144 over, respectively, interfaces 110 and 148 of FIG. 1B. TVWS TRXS 604 may support communications with sensors 107a and UAV 107b over, respectively, interfaces 106a and 106b in order to receive sensor data and video data. In another implementation, communications with sensors 107a and UAV 107b may be implemented over interfaces 106a and 106b using Wi-Fi TRXS 602. UIS 608 provide an interface that allows a gateway user to exchange control/configuration information with gateway 600. UIS 608 may be implemented as part of gateway 600 or may be implemented through use of devices, such as computing devices 144.

Memory/storage 610 may be implemented as any type of computer readable storage media, including non-volatile and volatile memory. Memory/storage 610 is shown as including operating system (OS) 612, UAV control programs 614, gateway control programs 616, service programs 618, and web server programs 620. Processing unit 606 may comprise one or more processors, or other control circuitry, or any combination of processors and control circuitry that provide overall control of gateway 600 according to the disclosed embodiments.

Gateway control programs 616 may cause processing unit 606 to control gateway 600 to perform functions described for gateway 102 in FIG. 2 and(or FIG. 3B. Service programs 618 may cause processing unit 606 to control gateway 600 to provide the service functions 128 described in relation to FIG. 1B. Web server programs 620 may cause processing unit 606 to control gateway 600 to provide the functions of web server 130 described in relation to FIG. 1B. UAV control programs 614 may implement UAV flight planner 146 of FIG. 1B in gateway 500. In other implementations UAV flight planner may be a separate device.

The example embodiments disclosed herein may be described in the general context of processor-executable code or instructions stored on memory that may comprise one or more computer readable storage media (e.g., tangible non-transitory computer-readable storage media such as memory 610). As should be readily understood, the terms "computer-readable storage media" or "non-transitory computer-readable media" include the media for storing of data, code and program instructions, such as memory 610, and do not include portions of the media for storing transitory propagated or modulated data communication signals.

While implementations have been disclosed and described as having functions implemented on particular wireless devices operating in a network, one or more of the described functions for the devices may be implemented on a different one of the devices than shown in the figures, or on different types of equipment operating in different systems.

While the functionality disclosed herein has been described by illustrative example using descriptions of the various components and devices of embodiments by referring to functional blocks and processors or processing units, controllers, and memory including, instructions and code, the functions and processes of the embodiments may be implemented and performed using any appropriate functional blocks, type of processor, circuitry or combinations of processors and/or circuitry and code. This may include, at least in part, one or more hardware logic components. For example, and without limitation, illustrative types of hardware logic components that can be used include field programmable gate arrays (FPGAs), application specific integrated circuits (ASICs), application specific standard products (ASSPs), system-on-a-chip systems (SOCs), complex programmable logic devices (CPLDs), etc. Use of the term processor or processing unit in this disclosure is meant to include all such implementations.

Embodiments have been disclosed that include an apparatus in a local network communicating with a cloud network, the apparatus comprising one or more processors, and, memory in communication with the one or more processors, the memory comprising; code that, when executed, causes the one or more processors to control the apparatus to receive first data from at least one sensor, process a first portion of the first data to generate second data, queue the second data as having a non-time sensitive priority for sending to the cloud network when bandwidth is available, and, provide web services in die local network by processing a second portion of the first data and the second data. The first portion of the first data may comprise video data received from at least one camera and the second portion of the first data may comprise sensor data received from at least one environmental sensor, and the code may further cause the one or more processors to control the apparatus to process a first portion of the first data to generate second data by processing the video data to generate an orthomosaic, and provide web services in the local network by processing the orthomosaic and the sensor data to generate a precision map. The code may further cause the one or more processors to control the apparatus to provide web services in the local network by providing a viewing of a video based on the video data. The code may also cause the one or more processors to further control the apparatus to provide web services in the local network by providing a service based on the precision map. The code may also cause the one or more processors to further control the apparatus to queue the first portion of the first data as having a time sensitive priority for sending to the cloud network when bandwidth is available.

Embodiments have also been disclosed that include an apparatus comprising one or more processors, and, memory in communication with the one or more processors, the memory comprising code that, when executed, causes the one or more processors to control the apparatus to receive video data from at least one camera, convert the video data into an orthomosaic, generate processed data based on the orthomosaic, queue the orthomosaic as having a non-time sensitive priority for sending to a cloud network when bandwidth is available, and, provide off-line services at the apparatus utilizing the processed data. The one or more processors may further control the apparatus to receive sensor data from at least one environmental sensor, generate the processed data to include a map based on the orthomosaic and the sensor data, and, queue the sensor data as having time sensitive priority for sending to the cloud network when bandwidth is available. The sensor data may comprise initial sensor data, the map may comprise an initial map, and the one or more processors may further control the apparatus to receive updated sensor data from the at least one environmental sensor, generate an updated map based on the orthomosaic and the updated sensor data each time the updated sensor data is received, queue the updated orthomosaic as having a non-time sensitive priority for sending to a cloud network when bandwidth is available, queue the updated sensor data as having time sensitive priority for sending to the cloud network when bandwidth is available, and, provide off-line services at the apparatus utilizing the updated map. The sensor data may comprise moisture data and the map may comprise a moisture map. The sensor data may comprise temperature data and the map may comprise a temperature map. The sensor data may comprise pH data and the map may comprise a pH map. The video data may comprise initial video data, the orthomosaic may comprise an initial orthomosaic, and the one or more processors may control the apparatus to receive updated video data from the at least one camera, convert the updated video data into an updated orthomosaic, generate updated processed data based at least on the updated orthomosaic, queue the updated orthomosaic as having a non-time sensitive priority for sending to the cloud network, and, provide off-line services at the apparatus utilizing the updated processed data. The one or more processors may further control the apparatus to determine that bandwidth is available for sending non-time sensitive data to the cloud network, and, in response to a determination that bandwidth is available, send the processed data to the cloud network.

Further embodiments have been disclosed that included an apparatus comprising one or more processors, and, memory in communication with the one or more processors, the memory comprising code that, when executed, causes the one or more processors to control the apparatus to determine a desired latency for a service comprising a plurality of tasks, wherein the service includes processing data received at a gateway, allocate a first task of the plurality of tasks to the gateway or a cloud network, and a second task of the plurality of tasks to the gateway or the cloud network, based at least one on the desired latency and a network bandwidth available for communications between the gateway and the at least one cloud device, and, provide the service using the data received at the gateway and based on the allocation of the first and second tasks. The code may further causes the one or more processors to provide the service by controlling the system to profile the service during operation to determine at least one parameter, determine a current latency of the service, determine whether the current latency of the service satisfies the desired latency, and, perform, if the current latency of the service does not satisfy the desired latency, a re-allocation of the first task to the gateway or the cloud network based on at least the desired latency and the at least one parameter. The at least one parameter may comprise a processing time for each of the first at least one task and the second at least one task in the gateway and a processing time for each of the first at least one task and the second at least one task in the cloud network. The bandwidth may comprise an initial bandwidth and the at least one parameter may comprise a current bandwidth for communications between the gateway and the cloud network. The apparatus may be implemented in the gateway. The data received at the gateway may comprise data from at least one sensor. The data received at the gateway may comprise video data from a video camera.

Also, although the subject matter has been described in language specific to structural features and/or methodological operations or acts, it is to be understood that the subject matter defined in the appended claims is not necessarily limited to the specific features, operations, or acts described above. Rather, the specific features, operations, and acts described above are disclosed as example embodiments, implementations, and forms of implementing the claims and these example configurations and arrangements may be changed significantly without departing from the scope of the present disclosure. Moreover, although the example embodiments have been illustrated with reference to, particular elements and operations that facilitate the processes, these elements, and operations may or combined with or, be replaced by, any suitable devices, components, architecture or process that achieves the intended functionality of the embodiment. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. An apparatus in a local network communicating with a cloud network, the apparatus comprising:
   one or more processors; and,
   memory in communication with the one or more processors, the memory comprising code that, when executed, causes the one or more processors to control the apparatus to:
   receive first data from at least one sensor;
   process a first portion of the first data to generate second data;
   queue the second data as having a non-time sensitive priority for sending to the cloud network when bandwidth is available; and,
   provide web services in the local network by processing the second data and a second portion of the first data that is different from the first portion in the local network.

2. The apparatus of claim 1, wherein the first portion of the first data comprises video data received from at least one camera in an unmanned aerial vehicle and the second portion of the first data comprises sensor data received from at least one environmental sensor and, the code further causes the one or more processors to control the apparatus to process a first portion of the first data to generate second data by processing the video data to generate an orthomosaic, and provide web services in the local network by processing the orthomosaic and the sensor data to generate a precision map.

3. The apparatus of claim 2, wherein the code further causes the one or more processors to control the apparatus to provide web services in the local network by providing a viewing of a video based on the video data.

4. The apparatus of claim 2, wherein the code further causes the one or more processors to control the apparatus to provide web services in the local network by providing a service based on the precision map.

5. The apparatus of claim 2, wherein the code further causes the one or more processors to control the apparatus to queue the first portion of the first data as having a time sensitive priority for sending to the cloud network when bandwidth is available.

6. An apparatus comprising:
   one or more processors; and,
   memory in communication with the one or more processors, the memory comprising code that, when executed, causes the one or more processors to control the apparatus to:
   receive video data from at least one camera in a unmanned aerial vehicle;
   convert the video data into an orthomosaic;
   generate processed data based on the orthomosaic;
   queue the orthomosaic as having a non-time sensitive priority for sending to a cloud network when bandwidth is available; and,
   provide off-line services at the apparatus utilizing the processed data.

7. The apparatus of claim 6, wherein the one or more processors further control the apparatus to:
   receive sensor data from at least one environmental sensor;
   generate the processed data to include a map based on the orthomosaic and the sensor data; and,
   queue the sensor data as having time sensitive priority for sending to the cloud network when bandwidth is available.

8. The apparatus of claim 7, wherein the sensor data comprises initial sensor data, the map comprises an initial map, and the one or more processors further control the apparatus to:
   receive updated sensor data from the at least one environmental sensor;
   generate an updated map based on the orthomosaic and the updated sensor data each time the updated sensor data is received;
   queue the updated orthomosaic as having a non-time sensitive priority for sending to a cloud network when bandwidth is available;
   queue the updated sensor data as having time sensitive priority for sending to the cloud network when bandwidth is available; and,
   provide off-lino services at the apparatus utilizing the updated map.

9. The apparatus of claim 7, wherein the sensor data comprises moisture data and the map comprises a moisture map.

10. The apparatus of claim 7, wherein the sensor data, comprises temperature data and the map comprises a temperature map.

11. The apparatus of claim 7, wherein the sensor data comprises pH data and the map comprises a pH map.

12. The apparatus of claim 6, wherein the video data comprises initial video data, the orthomosaic comprises an initial orthomosaic and the one or more processors control the apparatus to:
   receive updated video data from the at least one camera;
   convert the updated video data into an updated orthomosaic;
   generate updated processed data based at least on the updated orthomosaic;
   queue the updated orthomosaic as having a non-time sensitive priority for sending to the cloud network; and,
   provide off-line services at the apparatus utilizing the updated processed data.

13. The apparatus of claim 6, wherein the one or more processors further control the apparatus to:
   determine that bandwidth is available for sending non-time sensitive data to the cloud network; and,
   in response to a determination that bandwidth is available, send the processed data to the cloud network.

14. An apparatus comprising:
   one or more processors; and,
   memory in communication with the one or more processors, the memory comprising code that, when executed, causes the one or more processors to control the apparatus to:
   determine a desired latency for a service comprising a plurality of tasks, wherein the service includes processing data received at a gateway;

allocate a first task of the plurality of tasks to the gateway or a cloud network, and a second task of the plurality of tasks to the gateway or the cloud network based at least one on the desired latency and a network bandwidth available for communications between the gateway and the at least one cloud device; and, provide the service using the data received at the gateway and based on the allocation of the first and second tasks.

15. The system of claim 14, wherein the code further causes the one or more processors to provide the service by controlling the system to:

profile the service during operation to determine at least one parameter;

determine a current latency of the service:

determine whether the current latency of the service satisfies the desired latency; and, perform, if the current latency of the service does not satisfy the desired latency, a re-allocation of the first task to the gateway or the cloud network based on at least the desired latency and the at least one parameter.

16. The system of claim 15, wherein the at least one parameter comprises a processing time for each of the first at least one task and the second at least one task in the gateway and a processing time for each of the first at least one task and the second at least one task in the cloud network.

17. The system of claim 15, wherein the bandwidth comprises an initial bandwidth and the at least one parameter comprises a current bandwidth for communications between the gateway and the cloud network.

18. The system of claim 14, wherein the apparatus is implemented in the gateway.

19. The system of claim 14, wherein the data received at the gateway comprises data from at least one sensor.

20. The system of claim 14, wherein the data received at the gateway comprises video data from a video camera.

21. The system of claim 14, wherein the first and second tasks are allocated to the gateway when network bandwidth is not available for communications between the gateway and the at least one cloud device.

* * * * *